United States Patent
Fontoura et al.

(10) Patent No.: US 7,577,644 B2
(45) Date of Patent: Aug. 18, 2009

(54) AUGMENTED SEARCH WITH ERROR DETECTION AND REPLACEMENT

(75) Inventors: Marcus Felipe Fontoura, Los Gatos, CA (US); Vanja Josifovski, Los Gatos, CA (US); Reiner Kraft, Gilroy, CA (US)

(73) Assignee: Yahoo! Inc., Sunnyvale, CA (US)

( * ) Notice: Subject to any disclaimer, the term of this patent is extended or adjusted under 35 U.S.C. 154(b) by 212 days.

(21) Appl. No.: 11/548,548

(22) Filed: Oct. 11, 2006

(65) Prior Publication Data

US 2008/0091650 A1    Apr. 17, 2008

(51) Int. Cl.
*G06F 17/30* (2006.01)

(52) U.S. Cl. .................................. 707/3; 707/5; 707/10

(58) Field of Classification Search ...................... 707/3, 707/5, 7, 6, 10, 4
See application file for complete search history.

(56) References Cited

U.S. PATENT DOCUMENTS

| | | | |
|---|---|---|---|
| 5,806,061 A * | 9/1998 | Chaudhuri et al. | 707/3 |
| 6,230,155 B1 | 5/2001 | Broder et al. | |
| 6,631,367 B2 * | 10/2003 | Teng et al. | 707/3 |
| 6,799,176 B1 | 9/2004 | Page | |
| 2004/0249682 A1 * | 12/2004 | DeMarcken et al. | 705/5 |
| 2006/0026013 A1 | 2/2006 | Kraft | |
| 2006/0167857 A1 | 7/2006 | Kraft et al. | |

OTHER PUBLICATIONS

U.S. Appl. No. 11/033,417, filed Jan. 10, 2005.
U.S. Appl. No. 11/033,100, filed Jan. 10, 2005.

* cited by examiner

*Primary Examiner*—Baoquoc N To
(74) *Attorney, Agent, or Firm*—Baker Botts L.L.P.

(57) ABSTRACT

In an example embodiment, the present invention provides methods and logic for enhancing augmented search, including contextual search, conducted by a search engine. In some instances, a contextual search might return a set of results that are less relevant than the set of results returned by algorithmic search. This might occur when the quantity of contextual information is very large or when the contextual information includes misspellings. An embodiment of the present invention detects such occurrences and corrects the set of results provided to the user by merging a ranked set of results from the contextual search with a ranked set of results from an algorithmic search. During this merge process, an embodiment of the present invention replaces irrelevant results from the contextual search with results from the algorithmic search if the latter results fall within the context used for the contextual search. Embodiments of the present invention might also be used to enhance, in a similar fashion, personalized search and other forms of augmented search.

18 Claims, 7 Drawing Sheets

AUGMENTED SEARCH WITH ERROR DETECTION AND REPLACEMENT

CROSS-REFERENCE TO RELATED APPLICATIONS

This application makes reference to the following commonly-owned U.S. patent applications, whose disclosures are incorporated herein by reference in their entirety for all purposes:

U.S. patent application Ser. No. 10/903,283, filed Jul. 29, 2004, in the name of Reiner Kraft, entitled "Search Systems and Methods Using In-Line Contextual Queries;"

U.S. patent application Ser. No. 11/033,100, filed Jan. 10, 2005, entitled "Search Systems and Methods with Enhanced Contextual Queries;"

U.S. patent applicaiton Ser. No. 11/033,417, filed Jan. 10, 2005, entitled "User Interfaces for Search Systems Using In-Line Contextual Queries;"

U.S. patent application Ser. No. 11/129,096, filed May 12, 2005, in the name of Reiner Kraft, Andreas Hartmann, and Farzin Maghoul, entitled "Systems and Methods for Contextual Transaction Proposals."

TECHNICAL FIELD

The present invention relates to augmented search and information retrieval, including contextual and/or personal search and information retrieval.

BACKGROUND

The World Wide Web (Web), as its name suggests, is a decentralized global collection of interlinked information, generally in the form of "pages" that may contain text, images, and/or media content related to virtually every topic imaginable. A user who knows or finds a uniform resource locator (URL) for a page can provide that URL to a Web client (generally referred to as a browser) and view the page almost instantly. Since Web pages typically include links (also referred to as "hyperlinks") to other pages, finding URLs is generally not difficult.

What is difficult for most users is finding URLs for pages and other resources that are of interest to them. The sheer volume of content available on the Web has turned the task of finding a page relevant to a particular interest into what may be the ultimate needle-in-a-haystack problem. To address this problem, an industry of search providers (e.g., Yahoo!, MSN, and Google) has evolved.

A search provider typically maintains a database of Web pages in which the URL of each page is associated with information (e.g., keywords, category data, etc.) reflecting its content. The search provider also maintains a search server that hosts a search page (or site) on the Web. The search page provide a form into which a user can enter a query that usually includes one or more terms indicative of the user's interest. Once a query is entered, the search server accesses the database and generates a list of "hits," typically URLs for pages whose content matches keywords derived from the user's query. This list is provided to the user.

Since queries can often return hundreds, thousands, or in some cases millions of hits, search providers have developed sophisticated algorithms for ranking the hits (i.e., determining an order for displaying hits to the user) such that the pages most relevant to a given query are likely to appear near the top of the list. Typical ranking algorithms take into account not only the keywords and their frequency of occurrence but also other information such as the number of other pages that link to the hit page, popularity of the hit page among users, and so on. These ranking algorithms are an important part of algorithmic search.

To further facilitate use of their services, some search providers now offer "search toolbar" add-ons for Web browser programs. A search toolbar typically provides a text box into which the user can type a query and a "Submit" button for submitting the query to the search provider's server. Once installed by the user, the search toolbar is generally visible no matter what page the user is viewing, enabling the user to enter a query at any time without first navigating to the search provider's Web site. Searches initiated via the toolbar are processed in the same way as searches initiated at the provider's site; the only difference is that the user is spared the step of navigating to the search provider's site.

While automated search technologies can be very helpful, they do have a number of technological limitations, a primary one being that a user often has difficulty formulating a query to direct the search to relevant content. A query that is too general might return a large quantity of hits, few of which are relevant. A query that is too specific might fail to return many relevant hits.

Contextual information provides a means of directing a user's search to more relevant content. A user often has a fairly specific context in mind at the time of making a query, but the query might not unambiguously express this context. So for example, a user who enters the query "jaguar" might be thinking of the automobile, rather than the animal, the professional football team, or something else. But the entered query "jaguar" does not express this specific context.

In principle and in practice, contextual information might be gleaned from what the user was doing before or at the time of entering the query. A user is often inspired to conduct a search when prompted by information the user is currently viewing. Returning to the example above, a user who enters the query "jaguar" after (or while) viewing an automobile-related page is most likely interested in the automobile, while a user who enters the same query after (or while) viewing a page about zoos is most likely interested in the animal.

Until recently, search technologies did not provide reliable ways of gathering such contextual information or using it to respond to a query. However, as shown by the above cross-references, at least one search provider now provides an interface for gathering contextual information from a user and using that gathered information when processing the user's query.

Still this new search technology has limitations of its own. Sometimes, a user's contextual information will be quite large, as for example, when the user selects or enters, as context, the textual content of all or part of a web page. When given large amounts of contextual information, the new search technology might return hits that are even less relevant than those returned without the use of contextual information. In addition, contextual or other augmented search systems may rank the results in a manner less meaningful to the user than algorithmic searches.

Less relevant hits might also result from contextual information that is quite small when that contextual information is misdirecting. This might occur, for example, when the user makes or adopts a spelling error when entering contextual information. Consequently, there is a need to improve contextual and other augmented search systems.

SUMMARY OF THE INVENTION

Embodiments of the present invention provide apparatuses, methods, and systems for enhancing search technology. In some embodiments, the present invention involves intelligently integrating a set of results from contextual search with a set of results from algorithmic search, in order to return the set of results most relevant to a user's query.

In one implementation, this process of integration involves merging or joining a ranked list of resources resulting from a contextual search with a ranked list of resources resulting from an algorithmic search. In one implementation, this process of merging or joining also involves comparison of the items on the ranked list resulting from algorithmic search with the context provided by or gleaned from the user.

In other embodiments of the present invention, the apparatuses, methods, and systems involve integrating a set of results from personalized search with a set of results from algorithmic search, in order to return the set of results most relevant to a user's query. In one implementation, this integration process involves merging or joining a ranked list of resources resulting from personalized search with a ranked list of resources resulting from algorithmic search. In one implementation, this process of merging or joining involves comparison of the items on the ranked list resulting from algorithmic search with the profile provided by or gleaned from the user.

In still other embodiments, the present invention's apparatuses, methods, and systems involve integrating a set of results from contextual search and a set of results from personalized search with a set of results from algorithmic search, in order to return the set of results most relevant to a query. In one implementation, this integration process involves merging or joining ranked lists or resources from contextual search, personalized search, and algorithmic search. In one implementation, this process of merging or joining involves comparison of the items on the ranked list resulting from algorithmic search with the context and the profile provided by or gleaned from the user.

The following detailed description together with the accompanying drawings will provide a better understanding of the nature and advantages of various implementations of the present invention.

DESCRIPTION OF EXAMPLE EMBODIMENT(S)

The following example embodiments and their aspects are described and illustrated in conjunction with apparatuses, methods, and systems which are meant to be illustrative examples, not limiting in scope.

A. Network Implementation

Figure 1:
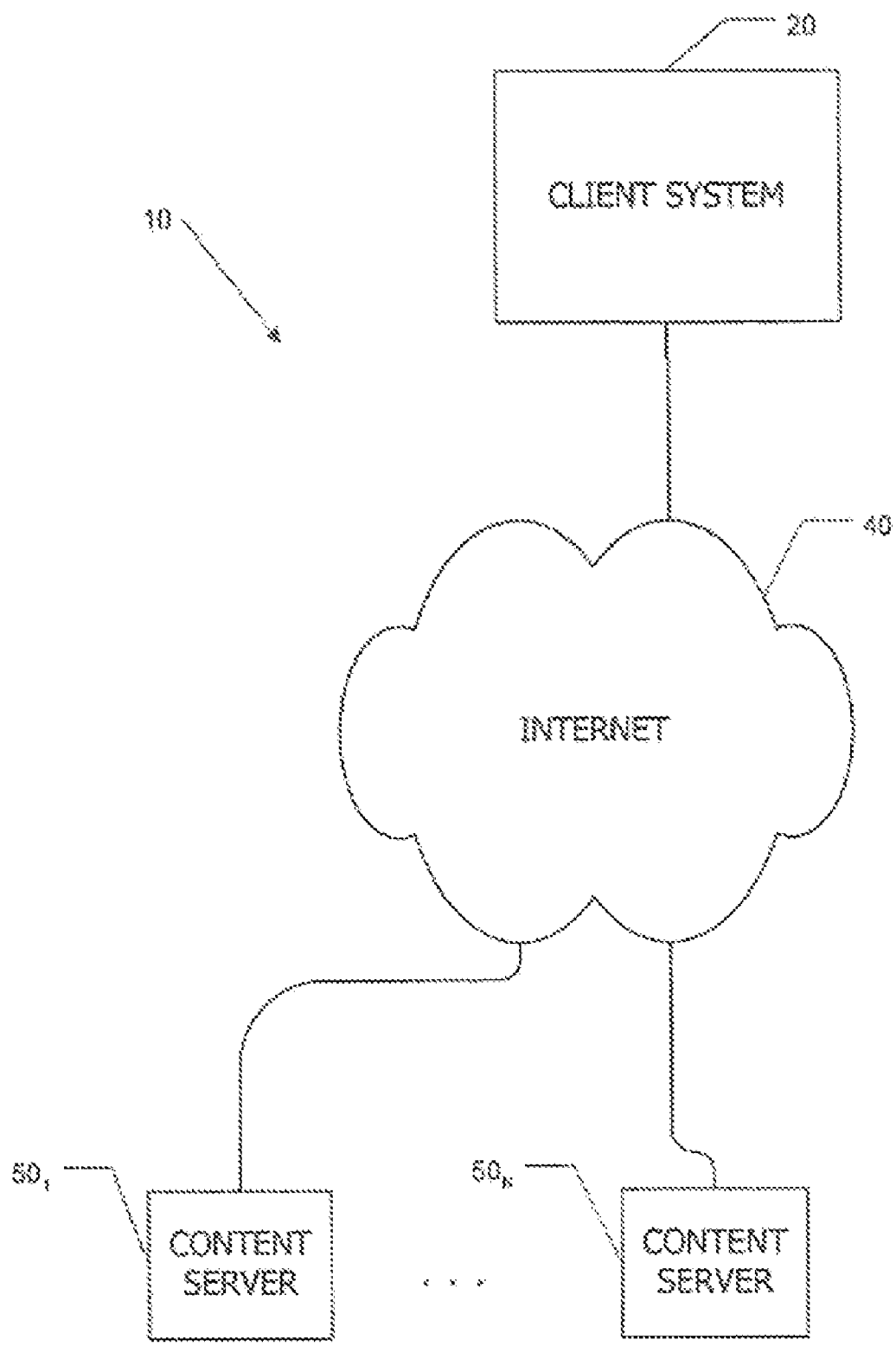
FIG. 1 is a diagram showing an information retrieval and communication network, which network might be used with an embodiment of the present invention.

FIG. 1 illustrates a general overview of an information retrieval and communication network 10 including a client system 20 according to an embodiment of the preset invention. In computer network 10, client system 20 is coupled through the Internet 40, or other communication network, e.g., over any local area network (LAN) or wide area network (WAN) connection, to any number of content server systems $50_1$ to $50_N$. As will be described herein, client system 20 is configured according to the present invention to communicates with any of content server systems $50_1$ to $50_N$, e.g., to access, receive, retrieve and/or display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP (Wireless Application Protocol)-enabled device or any other computing device capable of interfacing directly or indirectly to the Internet. Client system 20 typically runs a browsing program, such as Microsoft's Internet Explorer™ browser, Netscape Navigator™ browser, Mozilla Firefox™ browser, Opera™ browser, or a WAP-enabled browser in the case of a cell phone, PDA or other wireless device, or the like, allowing a user of client system 20 to access, process and view information and pages available to it from content server systems $50_1$ to $50_N$ over Internet 40.

Client system 20 also typically includes one or more user interface devices, such as a keyboard, a mouse, touch screen, pen or the like, for interacting with a graphical user interface (GUI) provided by the browser on a display (e.g., monitor screen, LCD display, etc.), in conjunction with pages, forms and other information provided by content server systems $50_1$ to $50_N$ or other servers. The present invention is suitable for use with the Internet, which refers to a specific global network of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are configurable and made operative using an application including computer code run using a central processing unit such as an Intel x86-compatible microprocessor, and AMD x86-compatible microprocessor, or the like or multiple microprocessors. Computer code for configuring and operating client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital video disk (DVD) medium, a floppy disk, and the like. Additionally, the entire program code, or portions thereof, may be transmitted and downloaded from a software source, e.g., from one of content server systems $50_1$ to $50_N$ to client system 20 over the Internet, or transmitted over any other network connection (e.g., extranet, VPN, LAN or other conventional networks) using any communication medium and protocol (e.g., TCP/IP, HTTP, HTTPS, Ethernet, or other conventional medial and protocol).

It should be appreciated that computer code for implementing embodiments of the present invention can be C, C++, HTML, XML, Java, JavaScript, etc., or any suitable scripting language, e.g., VBScript, or any other suitable programming language that can be executed on client system 20 or compiled to execute on client system 20. In some embodiments, no code is downloaded to client system 20, and needed code is executed by a server, or code already present at client system 20 is executed.

B. Search System

Figure 2:
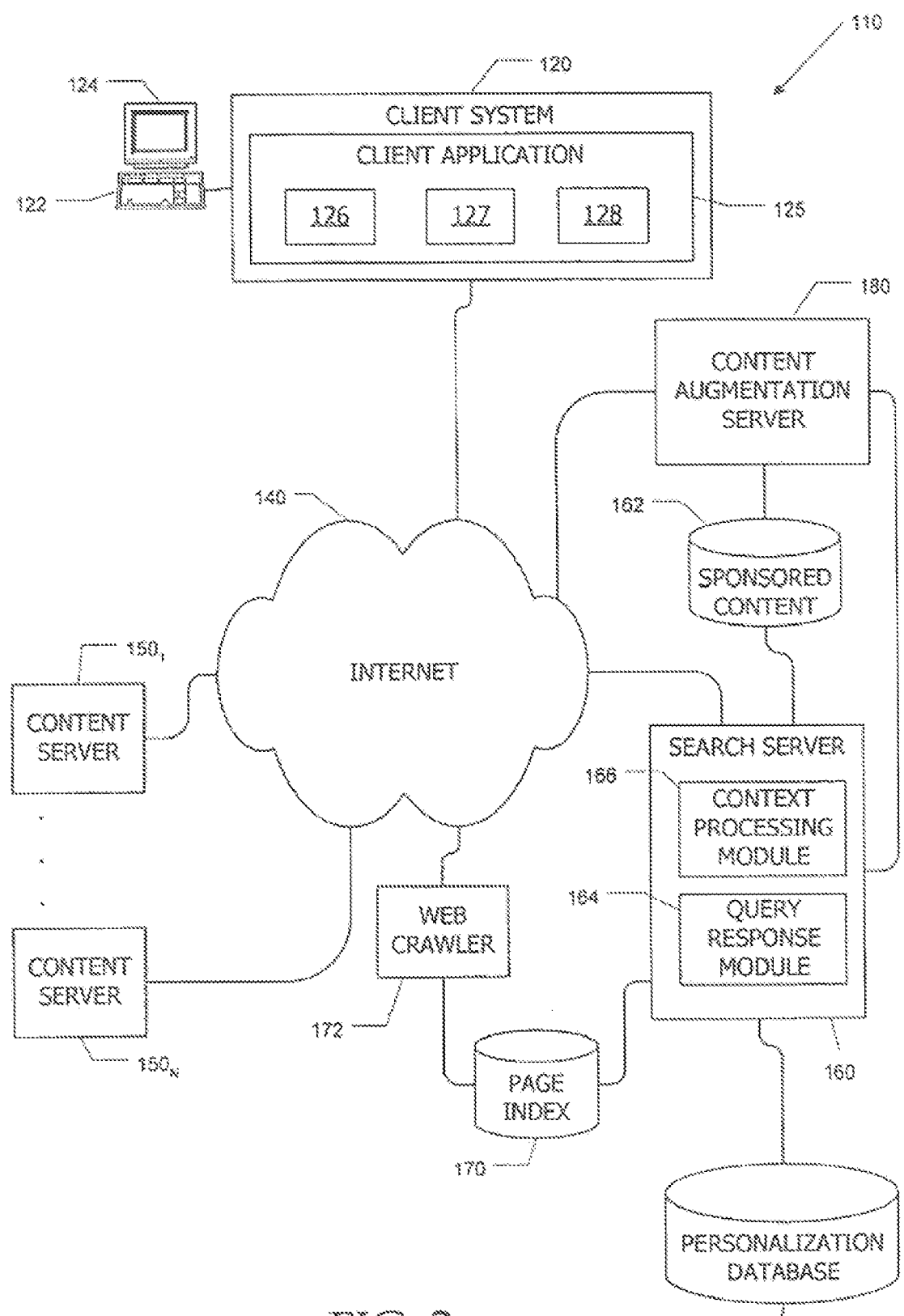
FIG. 2 is a diagram showing an information retrieval and communication network that enables algorithmic and contextual search queries, which network might be used with an embodiment of the present invention.

FIG. 2 illustrates another example of an information retrieval and communication network 110 for communicating media content according to an embodiment of the invention. As shown, network 110 includes client system 120 (which corresponds to client system 20 in FIG. 1), one or more content server systems 150 (which correspond to content server systems $50_1$ to $50_N$ in FIG. 1), and a search server system 160. In network 110, client system 120 is communicably coupled through Internet 140 or other communication network to server systems 150 and 160. As discussed above, client system 120 and its components might be configured to communicate with server systems 150 and 160 and other server systems over Internet 140 or other communication networks.

1. Client System

According to one embodiment, a client application (represented as module 125) executing on client system 120 includes instructions for controlling client system 120 and its components to communicate with server systems 150 and 160 and to process and display data content received from those server systems. Client application 125 may be transmitted and downloaded to client system 120 from a software source such as a remote server system (e.g., server systems 150, server system 160 or other remote server system), or client application module 125 may also be provided on any software storage medium (floppy disk, CD, DVD, etc.) that is readable by client system 120 as discussed above. For example, in one embodiment, client application 125 may be provided over Internet 140 to client system 120 in an HTML wrapper including various controls such as, for example, embedded JavaScript or Active X controls, for manipulating data and rendering data in various objects, frames, and windows.

Client application module 125 advantageously includes various software modules for processing data and media content. In one embodiment, these modules include a specialized search module 126, a user interface module 127, and an application interface module 128. Specialized search module 126 is configured for processing search requests (also referred to herein as queries) to be sent to search server 160 and search result data received from search server 160. Specific embodiments of specialized search module 126 are described below.

User interface module 127 is configured for rendering data and media content in text and data frames and active windows, e.g., browser windows and dialog boxes. In some embodiments, user interface module 127 includes or communicates with a browser program, which may be a default browser configured on client system 120 or a different browser. Application interface module 128 is configured to support interfacing and communicating between client application 125 and various other applications executing on client 120, such as e-mail application, instant messaging (IM) applications, browser applications, document management applications and others.

User interface module 127 advantageously provides user input interfaces allowing the user to enter queries for processing by search server system 160. For example, where user interface module 127 includes or communicates with a browser, the user may be able to enter a URL or activate a control button to direct the browser to a Web search page (or site) from which the user can submit a query to search server system 160 for processing. In addition or instead, user interface module 127 may include a search toolbar or other interface via which the user can enter and submit a query without first navigating to the search page. Queries entered using user interface module 127 may be preprocessed by specialized search module 126 prior to being sent to search server system 160, e.g., to remove so-called "stop words" ("the," "and," etc.), to correct spelling errors, or the like.

In accordance with an embodiment of the present invention, client application 125 may include various features for adding context information (referred to herein as a "context vector") to the user's queries. For example, specialized search module 126 may be configured to generate context vectors based on content the user is currently viewing at the time a query is entered. As another example, in some embodiments of the present invention, Web pages displayed in the browser may include one or more context vectors that can be used to supplement user-entered queries. User interface module 127 may be configured to detect such contextual vectors in a page being displayed and use context vector data to supplement a query entered by the user. Alternatively, user interface module 127 may be configured to allow the user to enter contextual information in an interface component such as a window.

2. Search Server System

According to one embodiment of the invention, search server system 160 is configured to provide search result data and media content to client system 120, and content server system 150 is configured to provide data and media content such as web pages to client system 120, for example, in response to links selected by the user in search result pages provided by search server system 160. In some variations, search server system 160 returns content as well as, or instead of, links and/or other references to content.

Search server system 160 references various page indexes 170 that are populated with, e.g., pages, links to pages, data representing the content of indexed pages, etc. Page indexes may be generated by various collection technologies such as an automatic web crawler 172; in addition, manual or semi-automatic classification algorithms and interfaces may be provided for classifying and ranking web pages within a hierarchical category structure. Such technologies and algorithms may be of generally conventional design, and a detailed description is omitted as not being critical to the present invention.

In one embodiment, an entry in page index 170 includes a search term, a reference (e.g., a URL or other encoded identifier) to a page in which that term appears and a context identifier for the page. The context identifier may be used for grouping similar results for search terms that may have different meanings in different contexts. For example, the search term "jaguar" may refer to the British automobile, to an animal, to a professional football team, and so on. The context identifier for a page can be used to indicate which of these contexts is applicable. In one embodiment, the context identifier includes a category for the page, with the category being assigned from a predefined hierarchical taxonomy of content categories. A page reference may be associated with multiple context identifiers, so the same page (or a link thereto) may be displayed in multiple contexts. In some embodiments, context identifiers are automatically associated with page links by the system as users perform various searches; the identifiers may also be modified and associated with links manually by a team of one or more index editors.

Search server system 160 is configured to provide data responsive to various search requests received from a client system 120, in particular from search module 126 and/or user interface module 127. For example, search server system 160 may include a query response module 164 that is configured with search related algorithms for identifying and ranking Web pages relative to a given query, e.g., based on a combination of logical relevance (which may be measured by patterns of occurrence of search terms in the query), context identifiers, page sponsorship, etc. In an embodiment of the present invention, algorithmic search comprises some of these algorithms.

In accordance with an embodiment of the present invention, query response module 164 is also configured to receive and make use of context vector data that may be provided in association with a query in order to further enhance the response to queries. Use of context vector data in responding to queries is described further below. Query response module 164 may also enhance search result information with additional information (e.g., links and/or advertising copy) obtained from a sponsored content database 162. Sponsored content database 162 may be implemented as part of page index 170 by the inclusion of additional fields in each entry to identify page references that are sponsored and keywords for triggering the display of sponsored content, or it may be implemented in a separate database.

In some embodiments, search server 160 also includes a context processing module 166 that is configured with various algorithms for processing received content to generate a context vector representative of the received content. In general, a context vector may include any data that represents all or part of the content. For example, one embodiment of a context vector for test content may include keywords such as terms (e.g., words or phrases) that appear in the content, and each such term may have an associated frequency count reflecting how many times that term occurs in the content. Other types of data may also be included, e.g., URLs or other data identifying any links that may be included in the content, the URL or other identifier of the page that contains the content, category data associated with the content or with a page that contains the content, and so on. In some embodiments of the present invention, contextual search makes use of these algorithms for processing received content.

In some embodiments, a content augmentation server 180 is also provided. Content augmentation server 180 communicates via Internet 140 with client application 125 to enhance the content of a Web page being displayed with "special content" that is advantageously selected based on context vector data associated with the displayed page. In circumstances where the user has indicated an interest information related to a particular context, client application 125 transmits a context vector to content augmentation server 180, and content augmentation server 180 responds with special content to be added to a Web page being displayed by client application 125.

In one embodiment, content augmentation server 180 and search server 160 are under common control, and content augmentation server 180 advantageously selects special content from sponsored content database 162. In another embodiment, content augmentation server 180 may be independent of search server 160 and may have its own database of special content from which selections can be made based on context vectors provided by client application 125.

A content augmentation server can be implemented in the same computer system as the search server or in a different server, and the content augmentation server may communicate with a client system via the search server or independently of the search server. The content augmentation server advantageously maintains various data stores containing information and rules used to select special content given a particular context vector (or other representation of context data).

Other embodiments include user personalization features allowing data specific to the user as well as the context to inform the selection of search results, including contextual search results, and proposed transactions. For example, the search provider may maintain a user profile for each registered user of its services in a personalization database 167. When a registered user who is logged in executes a search (contextual or otherwise) or clicks through to a proposed transaction from a contextual search interface, information about the operation can be recorded and associated with the user. By analyzing patterns in a given user's behavior, a "user vector" may be developed, which can be used during search processing, e.g., in identifying and/or ranking search results. In some embodiments of the present invention, personalized search makes use of personalization database 167.

It will be appreciated that the search system described herein is illustrative and that variations and modifications are possible. The content server, search server, and content augmentation server systems may be part of a single organization, e.g., a distributed server system such as that provided to users by Yahoo! Inc., or they may be part of disparate organizations. Each server system generally includes at least one server and an associated database system, and may include multiple servers and associated database systems, which although shown as a single block, may be geographically distributed.

For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably.

The search server system may be configured with one or more page indexes and algorithms for accessing the page indexes and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

Figure 3:
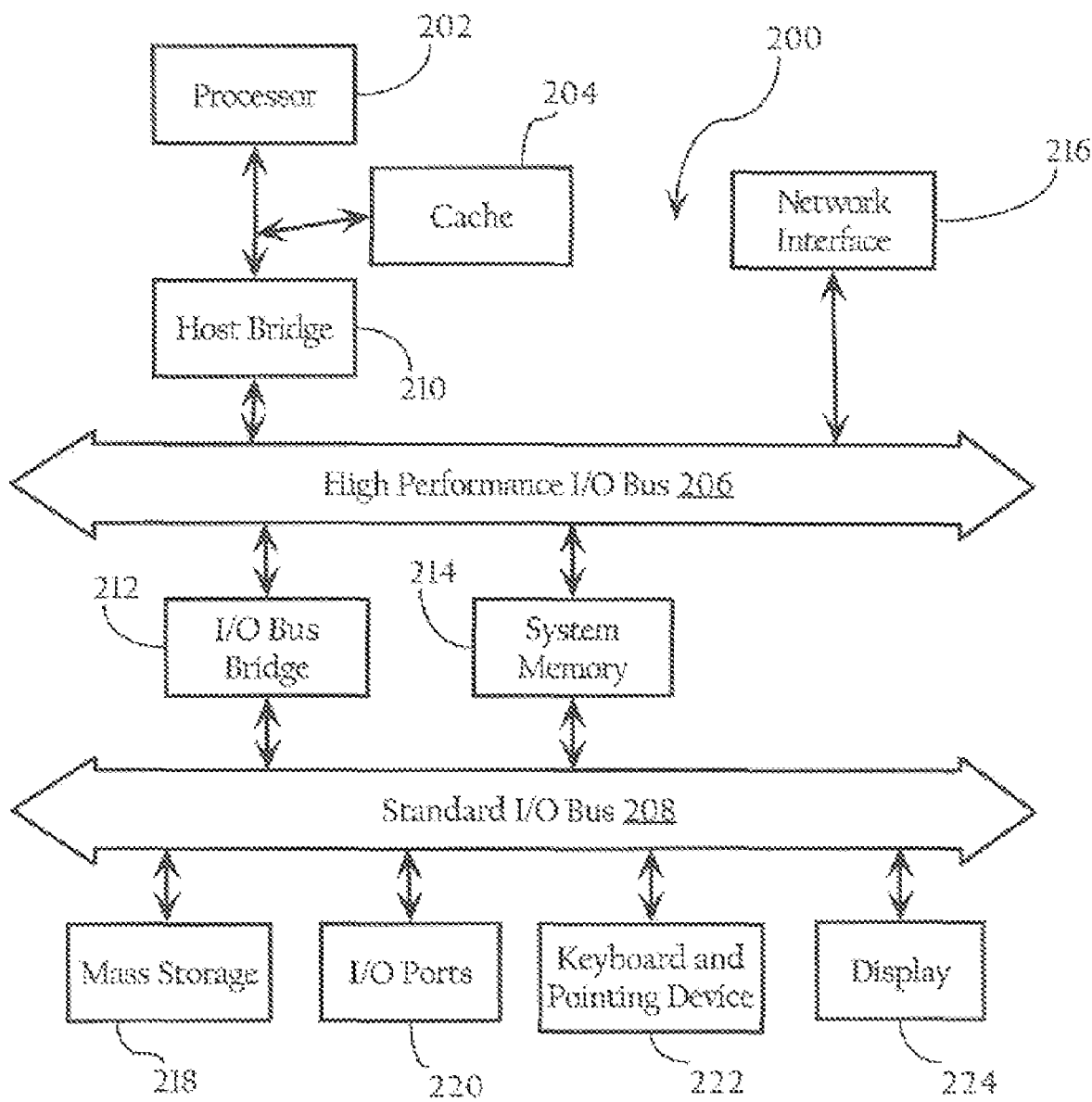
FIG. 3 is a diagram showing the system architecture for a content server, a search server, or a content augmentation server, which any of which servers might be used by an embodiment of the present invention.

FIG. 3 illustrates, for didactic purposes, a hardware system 200, which may be used to implement a content server, a search server, or a content augmentation server. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In one implementation, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processor manufactured by Advanced Micro Devices (AMD), Inc., of Sunnyvale, Calif., as well as nay other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core."

Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

In one embodiment, the search operations (algorithmic, contextual, personalized, augmented, etc.) described herein are implemented as a series of software routines run by hardware system 200. These software routines comprise a plurality of series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP operating system, available from Microsoft Corporation of Redmond, Wash., the Apple Macintosh Operating System, available from Apple Computer Inc. of Cupertino, Calif., UNIX operating systems, and the like.

C. Augmented Search

Figure 4:
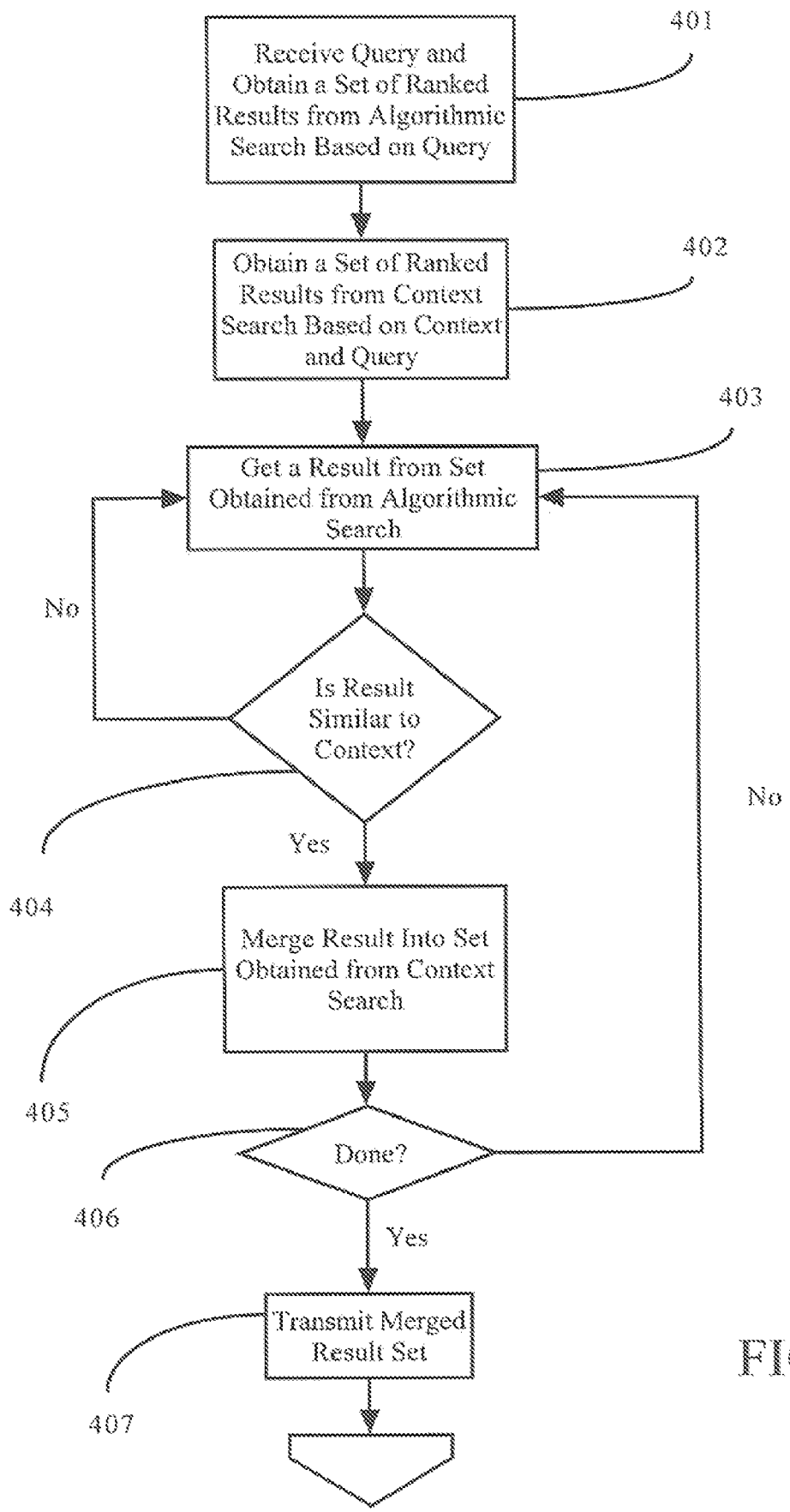
FIG. 4 is a diagram showing a flowchart of the process used for contextual search, which process might be used with an embodiment of the present invention.

FIG. 4 shows a flowchart of the process for contextual search, which process might be used by an implementation of the present invention. In the process's first step 401, the implementation receives a query and obtains a set of ranked results with the functionality for algorithmic search described above, abase upon the user's query. In the process's next step 402, the implementation obtains a set of ranked results with the functionality for contextual search described above, based upon the context provided or gleaned from the user and the user's query. In both results, the rankings are based on one more parameter values corresponding to each result, such as a PageRank or other metric. Then in step 403 and 404 of the process, the implementation compares a result from the set of results from algorithmic search to the user's context. If the result is within a threshold similarity to the context, the implementation merges the result into the set of results obtained with contextual search. This merge or join operation occurs in step 405 and preserves rank in the resulting set. This merge or join operation might result in the displacement of a result that is already in the set, in some implementations of the present invention. In step 406 of the process, the implementation makes a determination as to whether the process is finished. In some implementations, this determination might involve a pre-determined number with respect to the size of the merged set, e.g., 20 results. This process can then be repeated for the next X (e.g., 20 results) if a request to view the next X results are received. In other implementations, the process will finish only upon the processing of all of the results in the set of results from algorithmic search. Since the merged set in such implementations might be relatively large, such implementations might display only a portion of the merged set to a user, e.g., the 10 top-ranked results. In step 407, the process concludes by transmitting the ranked merged set as a response to the user's query.

As described above, steps 401 and 402 involve the obtaining of ranked sets. Likewise, the set that results from the process in FIG. 4 is a ranked set. In some implementations, the items in these ranked sets might be ranked in terms of relevance or importance using a method such as PageRank, as described in U.S. Pat. No. 6,799,176, or such as tf-idf (term frequency-inverse document frequency). In other implementations, the items in these ranked set might be ranked based, in part, on other parameters such as page sponsorship or paid inclusion. Also, as noted above, step 405 involves the merging of one ranked set into another ranked set in a way that preserves rank. Because the sets are already ranked, this merge or join operation is less complex and can make use of steps from an algorithm such as merge sort. As used here, the term "preserves rank" means that the set resulting from the merge will be ranked using the same parameter or parameters which were used to rank the separate results obtained using algorithmic and contextual search. So for example, assume that contextual search returns a ranked list which includes items with parameter values of 33 and 40, as well as other items with parameter values less than 33 and greater than 40. If algorithmic search returned a result with a parameter value of 36 and the result met the threshold for similarity with the user's context, the result would be merged into the list resulting from contextual search between the result with a parameter value of 33 and the result with a parameter value of 40.

Further, in step 404 of the process shown in FIG. 4, the implementation compares a result from algorithmic search with the context provided with or gleaned from the user. When doing this comparison, some implementations of the present invention use snippets returned by the algorithmic search functionality described above or document summarization. Other implementations compare the entirety of the result to the context. Also when doing this comparison, some implementations use methods for resemblance analysis such as Broder's Method (or shingles), as described in U.S. Pat. No. 6,230,155. Alternatively, an implementation might use hashing or a nearest neighbor algorithm for resemblance analysis.

Also, some implementations of the present invention do not require that the sets obtained from algorithmic search and contextual be ranked sets. In such implementations, the present invention will rank the sets using a parameter or group of parameters. Likewise, in some implementations of the present invention, the sets obtained from algorithmic and contextual search will be ranked according one parameter or group of parameters, but the present invention will re-rank the sets according to another parameter or group of parameters before doing the merge.

Figure 5:
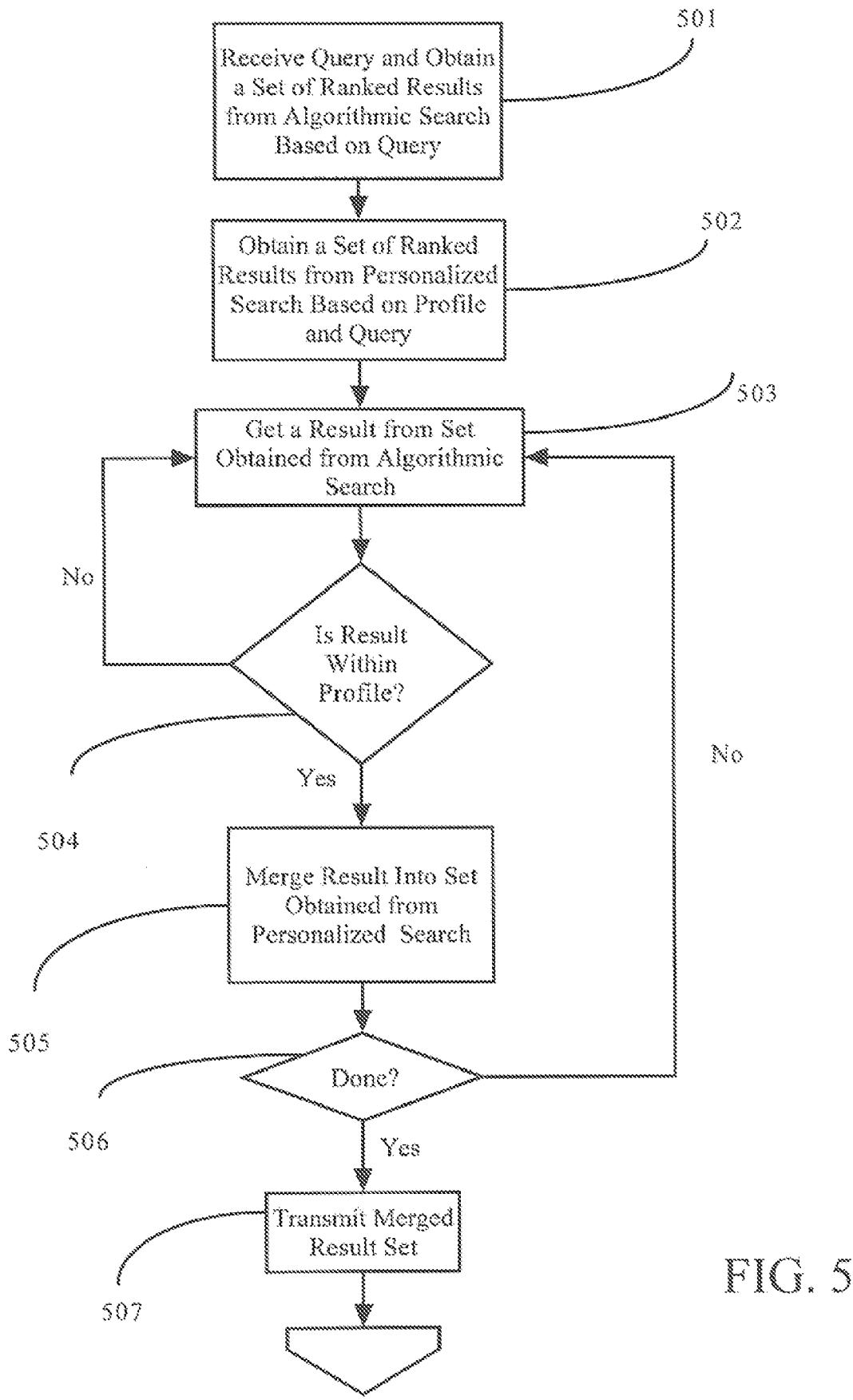
FIG. 5 is a diagram showing a flowchart of the process used for personalized search, which process might be used with an embodiment of the present invention.

FIG. 5 shows a flowchart of the process for personalized search, which process might be used by an implementation of the present invention. In the process's first step 501, the implementation receives a query and obtains a set of ranked results with the functionality for algorithmic search described above, based upon the user's query. In the process's next step 502, the implementation obtains a set of ranked results with the functionality for personalized search described above, based upon the profile provided or gleaned from the user and the user's query. Then in steps 503 and 504 of the process, the implementation compares a result from the set of results from algorithmic search to the user's profile. If the result is within the profile, the implementation merges the result into the set of results obtained with personalized search. This merge or join operation occurs in step 505 and preserves rank in the resulting set. This merge or join operation might result in the displacement of a result that is already in the set, in some implementations of the present invention. In step 506 of the process, the implementation makes a determination as to whether the process is finished. Here again, in some implementations, this determination might involve a pre-determined number with respect to the size of the merged set, e.g., 20 results. In other implementations, the process will finish only upon processing of all of the results in the set of results from algorithmic search. Since the merged set in such implementations might be relatively large, such implementations might display only a portion of the merged set to a user, e.g., the 10 top-ranked results. In step 507, the process concludes by transmitting the ranked merged set as a response to the user's query.

Figure 6:
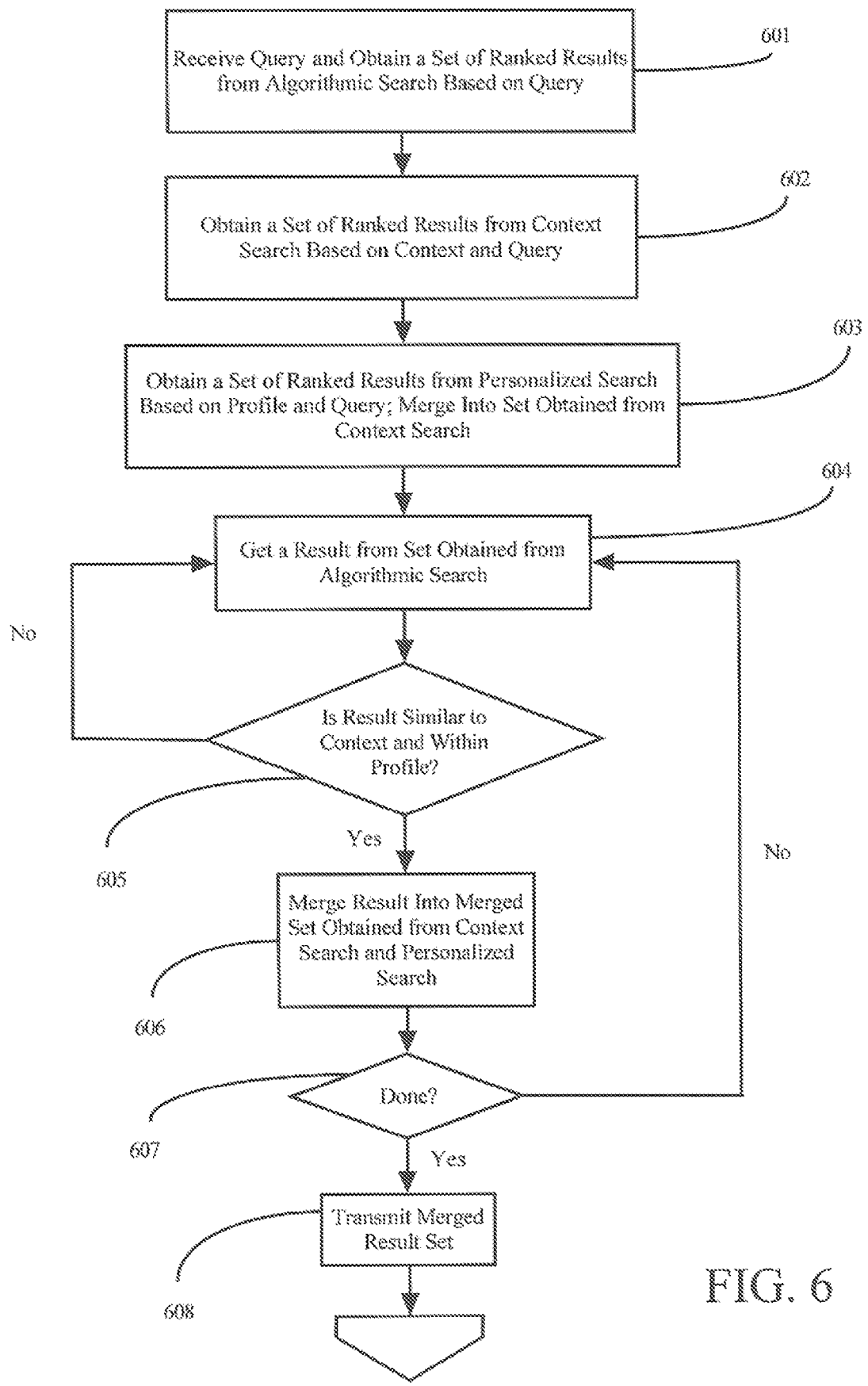
FIG. 6 is a diagram showing a flowchart of the process used for contextual and personalized search, which process might be used with an embodiment of the present invention.

FIG. 6 shows a flowchart of the process for contextual and personalized search, which process might be used by an implementation of the present invention. In the process's first step 601, the implementation receives a query and obtains a set of ranked results with the functionality for algorithmic search described above, base upon the user's query. In the process's next step 602, the implementation obtains a set of ranked results with the functionality for contextual search described above, based upon the context provided or gleaned from the user and the user's query. In the process's step 603, the implementation obtains a set of ranked results with the functionality for personalized search described above, based upon the profile provided or gleaned from the user and the user'query. Then, also in this step, the implementation merges the set of results from contextual search into the set of result from personalized search to create a set of combined ranked results. In steps 604 and 605 of the process, the implementation compares a result from the set of results from algorithmic search to the user's context and the user's profile. If the result is within the user's context and profile, the implementation merges the result into the set of combined ranked results that came out of step 602. This merge or join operation occurs in step 606 and preserves rank in the resulting set. This merge or join operation might result in the displacement of a result that is already in the set, in some implementations of the present invention. In step 607 of the process, the implementation makes a determination as to whether the process is finished. Here again, in some implementation, this determination might involve a pre-determined number with respect to the size of the merged set, e.g., 20 results. In other implementations, the process will finish only upon processing of all of the results in the set of results from algorithmic search. Since the merged set in such implementations might be relatively large, such implementations might display only a portion of the merged set to a user, e.g., the 10 top-ranked results. In step 608, the process concludes by transmitting the ranked merged set as a response to the user's query.

As with the process in FIG. 4, the processes in FIG. 5 and FIG. 6 take as inputs ranked sets and output a ranked set. Here again, in some implementations, the items in these ranked sets are ranked in terms of relevance or importance using a method such as PageRank or such as tf-idf. Alternatively, the items might be ranked based, in part, on other parameters such as page sponsorship or paid inclusion. Also, as with the process in FIG. 4, the processes in FIG. 5 and FIG. 6 might, in some implementations, make use of steps from an algorithm such as merge sort, since the sets to be merged or joined are already ranked.

Further, as with the process in FIG. 4, when determining whether a result from algorithmic search is within a context or a profile, the processes in FIG. 5 and FIG. 6 might, in some implementations, make use of snippets, document summarization, Broder's method (or shingles), hashing, and nearest-neighbor algorithms.

Figure 7:
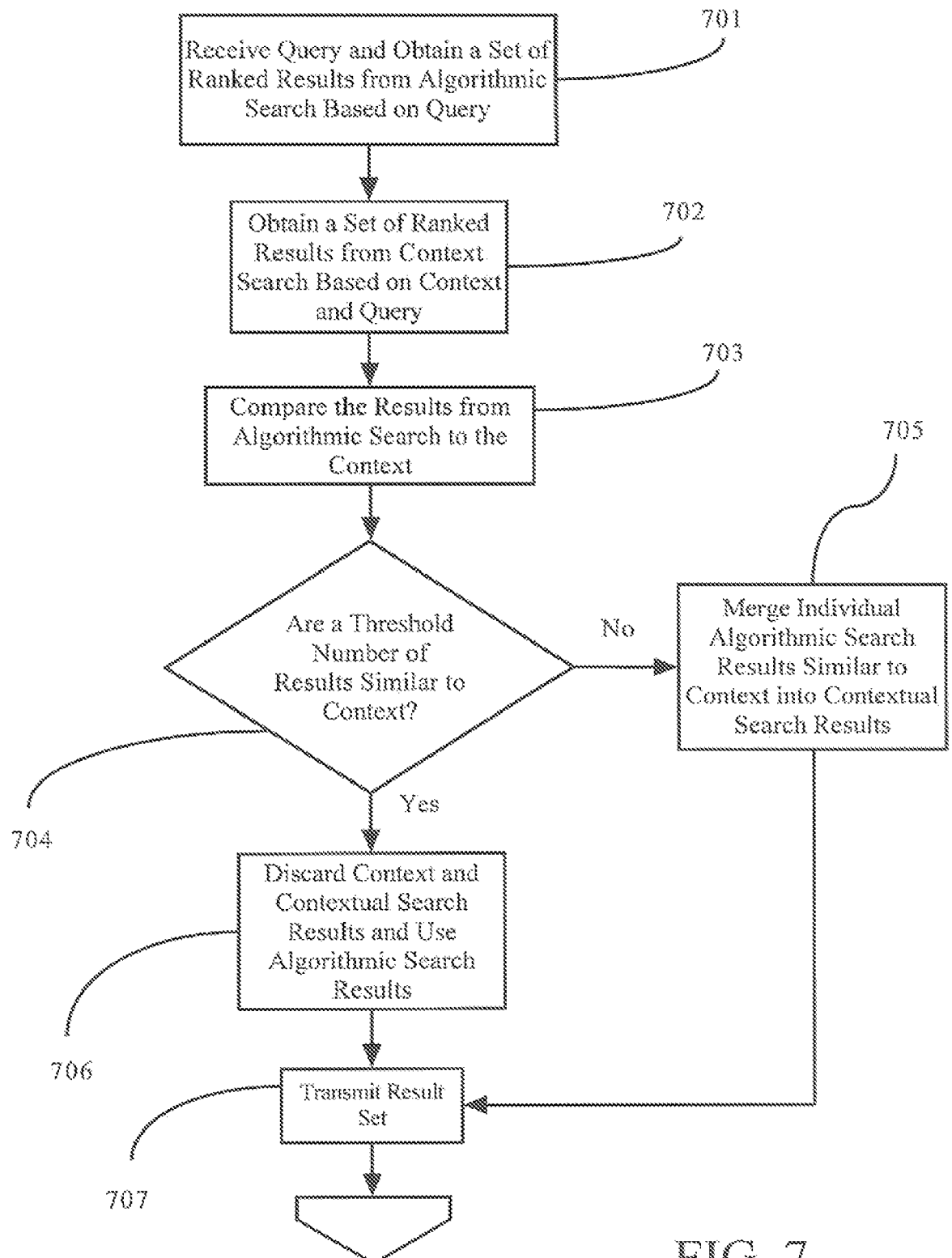
FIG. 7 is a diagram showing a flowchart of the process used for discarding a context and the results of a contextual search, which process might be used with an embodiment of the present invention.

FIG. 7 shows a flowchart of an alternative process for contextual search, which process might be used by an implementation of the present invention. Steps 701, 702, and 703 of the process are similar to steps 401, 402, 403, and 404 of the process shown in FIG. 4. That is to say, the implementation receives a query and obtains a set of ranked results with the functionality for algorithmic search, in step 701, and a set of ranked results with the functionality for contextual search, in step 702. Then the implementation compares the results from algorithmic search with the user's context, in step 703. However, if the number of matches with the context exceeds a threshold number in step 704, the implementation discards the context and the results from contextual search (since the context was contributing nothing to the ranked results from algorithmic search) and uses the ranked results from algorithmic search. This discarding is shown in step 706. If the number of matches with the context does not exceed the threshold number in step 704, the implementation proceeds as in FIG. 4 and uses the ranked set resulting from merging individual algorithmic results, which are similar to the context, into the ranked set resulting from contextual search. This merging is shown in step 705. In step 707, the process concludes by transmitting the ranked result set as a response to the user's query. Of course, this is merely one of many possible implementations which might employ a threshold number of matches for judging the quality of a context. Additional possible implementations might employ a threshold number of matches for judging the quality of a profile or the quality of other augmenting data.

As discussed above, the present invention, in one embodiment, might be comprised of instructions that are stored on storage media. The instructions might be retrieved and executed by a processing system. The instructions are operational when executed by the processing system to direct the processing system to operate in accord with the present invention.

Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiment that fall within the scope of the invention. In this regard, it will be appreciated that contextual search and personalized search are but specific instances of a more generalized form of search, namely, augmented search, which itself would benefit from the apparatuses, methods, and systems for error detection and correction described herein. In this more generalized form of search, augmenting data might include contexts, profiles, etc. As a result, the invention is note limited to the specific examples and illustrations discussed above, but only by the following claims and their equivalents.

What is claimed is:

1. A method, for providing relevant search results to a query, comprising:
   receiving, at a first computer server system, a query comprising one or more search terms;
   obtaining a context corresponding to the query, the context being representative of a currently viewed content or a history of viewed content;
   executing a first algorithmic search using at least one of the one or more search terms in the query;
   executing a second contextual search using the context and the at least one of the one or more search terms in the query;
   obtaining a first search result set from the executed first search;
   obtaining a second search result set from the executed second search;
   merging the first and second search result sets into a merged result set, wherein the merging includes
      conditionally excluding results in the first result set from the merged result set based on a threshold similarity to the context such that results in the first result set that are not within the threshold similarity to the context are excluded from the merged result set; and
   transmitting the merged result set as a response to the query.

2. The method according to claim 1, wherein the context is obtained manually from the user or from a history of viewed content corresponding to the user.

3. The method according to claim 1, wherein the results sets are ordered based upon a value of a ranking parameter.

4. The method according to claim 1, wherein the step of merging the search results ends upon achieving a threshold number of merged search results.

5. The method according to claim 1, wherein the step of merging the search results comprises one or more steps from the merge sort algorithm.

6. The method according to claim 1, further comprising displaying at least a portion of the merged result set to the user.

7. The method according to claim 1, wherein the result set of the second search is discarded in favor of the result set from the first search if a threshold number of results from the first search are similar to the context.

8. A method, for providing relevant search results to a user, comprising:
   receiving, at a first computer server system, a query comprising one or more search terms;
   obtaining a profile from the user or from data relating to the user, the profile being representative of a pattern of behavior of the user;
   executing a first algorithmic search using at least one of the one or more search terms in the query;
   executing a second personalized search using the profile and the at least one of the one or more search terms in the query;
   obtaining a first search result set from the executed first search
   obtaining a second search result set from the executed second search;
   merging the first and second search result sets into a merged result set, wherein the merging includes
      conditionally excluding results in the first result set from the merged result set based on a threshold similarity to the profile such that results in the first result set that are not within the threshold similarity to the profile are excluded from the merged result set; and
   transmitting the merged result set as a response to the query.

9. A method, for providing relevant search results to a query, comprising:
   receiving, at a first computer server system, a query comprising one or more search terms;
   obtaining a context corresponding to the query, the context being representative of a currently viewed content or a history of viewed content;
   obtaining a profile from the user or from data relating to the user, the profile being representative of a pattern of behavior of the user;
   executing a first algorithmic search using at least one of the one or more search terms in the query;
   executing a second contextual search using the context and the at least one of the one or more search terms in the query;

executing a third personalized search using the profile and the at least one of the one or more search terms in the query;

obtaining a first search result set from the executed first search;

obtaining a second search result set from the executed second search;

obtaining a third search result set from the executed third search; and merging the first, second, and third search result sets into a merged result set, wherein the merging includes conditionally excluding results in the first result set from the merged result set based on a threshold similarity to the context or a threshold similarity to the profile such that results in the first result set that are not within the threshold similarity to the context or the threshold similarity to the profile are excluded from the merged result set; and transmitting the merged result set as a response to the query.

10. One or more storage media having logic encoded thereon for execution on a data processing system, wherein the logic when executed is operable to:

receive a query from the user comprising one or more search terms;

obtain a context corresponding to the query, the context being representative of a currently viewed content or a history of viewed content;

execute a first algorithmic search using at least one of the one or more search terms in the query;

execute a second contextual search using the context and the at least one of the one or more search terms in the query;

obtain a first search result set from the executed first search;

obtain a second search result set from the executed second search; and merge the first and second search result sets into a merged result set, wherein in order to merge the first and second search result sets, the logic is further operable to conditionally exclude results in the first result set from the merged result set based on a threshold similarity to the context such that results in the first result set that are not within the threshold similarity to the context are excluded from the merged result set; and transmit the merged result set as a response to the query.

11. The storage media according to claim 10, wherein the logic when executed is further operable to obtain the context manually from the user or from a history of viewed content corresponding to the user.

12. The storage media according to claim 10, wherein the logic when executed is further operable to end the merge of the search results upon achieving a threshold number of merged search results.

13. The storage media according to claim 10, wherein the logic when executed is further operable to order the results sets based upon a value of a ranking parameter.

14. The storage media according to claim 10, wherein the logic to merge the search results further comprises one or more steps from the merge sort algorithm.

15. The storage media according to claim 10, wherein the logic when executed is further operable to:

display at least a portion of the merged result set to the user.

16. The storage media according to claim 10, wherein the second result set is discarded in favor of the first result set if a threshold number of results from the first search are similar to the context.

17. One or more storage media having logic encoded thereon for execution on a data processing system, wherein the logic when executed is operable to:

receive a query from the user comprising one or more search terms;

obtain a profile from the user or from data relating to the user, the profile being representative of a pattern of behavior of the user;

execute a first algorithmic search using at least one of the one or more search terms in the query;

execute a second personalized search using the profile and the at least one of the one or more search terms in the query;

obtain a first search result set from the executed first search;

obtain a second search result set from the executed second search;

merge the first and second search result sets into a merged result set, wherein in order to merge the first and second search result sets, the logic is further operable to conditionally exclude results in the first result set from the merged result set based on a threshold similarity to the profile such that results in the first result set that are not within the threshold similarity to the profile are excluded from the merged result set; and transmit the merged result set as a response to the query.

18. One or more storage media having logic encoded thereon for execution on a data processing system, wherein the logic when executed is operable to:

receive a query from the user comprising one or more search terms;

obtain a context corresponding to the query, the context being representative of a currently viewed content or a history of viewed content;

obtain a profile from the user or from data relating to the user, the profile being representative of a pattern of behavior of the user;

execute a first algorithmic search using at least one of the one or more search terms in the query;

execute a second contextual search using the context and the at least one of the one or more search terms in the query;

execute a third personalized search using the profile and the at least one of the one or more search terms in the query;

obtain a first search result set from the executed first search;

obtain a second search result set from the executed second search;

obtain a third search result set from the executed third search;

merge the first, second, and third search result sets into a merged result set, wherein in order to merge the first, second and third search result sets, the logic is further operable to conditionally exclude results in the first result set from the merged result set based on a threshold similarity to the context or a threshold similarity to the profile such that results in the first result set that are not within the threshold similarity to the context or the threshold similarity to the profile are excluded from the merged result set; and transmit the merged result set as a response to the query.

* * * * *